3,022,189
DAYLIGHT FLUORESCENT COATED FABRIC
Alfred Bruce Malmquist, Stoney Point, N.Y., assignor to E. I. du Pont de Nemours and Company, Wilmington, Del., a corporation of Delaware
No Drawing. Filed Jan. 19, 1961, Ser. No. 83,620
3 Claims. (Cl. 117—33.5)

This invention relates to layered sheet materials, and particularly, to such materials having a uniform daylight fluorescent color.

Daylight fluorescent dyes are widely used in advertising displays, safety paints and safety garments. Recently considerable improvement in the outdoor durability of the printing inks and coatings containing the fluorescent dyes has been accomplished by preparing "fluorescent pigment" particles which comprise a fluorescent coloring agent incorporated in an insoluble transparent melamine-sulfonamide-formaldehyde resin. Such "pigment" particles are prepared in accordance wtih the teaching of U.S. Patent 2,809,954.

"Daylight fluorescence" is described by Z. Kazenas in Paint Industry Magazine, February 1960. Certain organic dyestuffs have the property of fluorescing when activated by visible light of the blue end of the spectrum— that is, violet, blue, and blue-green light which is called daylight fluorescence.

The term "fluorescent pigment" as used hereinafter refers to daylight fluorescent colorants or dyes incorporated in transparent melamine-sulfonamide-formaldehyde resin particles produced in accordance with the teaching of U.S. Patent 2,809,954. The "fluorescent pigment" particles are stable at temperatures in the range of 350–400° F., i.e., the particles do not fuse or melt and lose their identity as particles at this temperature range. To achieve the maximum brightness and fluorescence of coatings and films containing the aforementioned "fluorescent pigment" particles, it is important that the "fluorescent pigment" particles remain as particles.

The plastisol process of preparing polyvinyl chloride coatings and film is ideally suited for preparing a binder for the "fluorescent pigments," since such compositions are free of active solvents which would dissolve the "fluorescent pigments." The plastisol process involves dispersing resin particles, such as polyvinyl chloride, in a plasticizer which is a non-solvent for the polyvinyl chloride at room temperature, to form a thick readily moldable or formable heavy paste-like composition. After the paste-like composition is formed into the desired shape, it is subjected to an elevated temperature at about 300–350° F. which dissolves and/or fuses the polyvinyl chloride resin particles in the plasticizer which upon cooling is converted to a tough continuous film. When the "fluorescent pigments" referred to above are incorporated into the polyvinyl chloride plastisols, the fusion temperature of 300–350° F. does not melt or destroy the particulate form of the "fluorescent pigments," however, the fluorescent color is darkened unevenly due to uneven temperatures which are usually present in the fusing ovens and a considerable unevenness in color is also encountered due to the method of application, or a combination of these factors.

It has now been discovered that the uneven color and darkening can be overcome by applying, over the unevenly discolored and darkened layer, a transparent surface layer of a solution of a vinyl chloride polymer having the daylight fluorescent dyes or colorants dissolved therein.

The objects of this invention are accomplished by applying to a white substrate a plastisol coating comprising particulate vinyl chloride resin and particulate daylight "fluorescent pigments" having a higher melting point than the vinyl chloride resin in a plasticizer for the polyvinyl chloride, which is a non-solvent for the polyvinyl chloride at room temperature and a solvent at elevated temperature, to form a plastisol coating. Heating the above described coated substrate to a temperature which dissolves or fuses the vinyl chloride resin in the plasticizer but not the "fluorescent pigment," whereby said plastisol coating becomes darkened and/or unevenly discolored, applying a transparent surface layer to said fused layer comprising a solution of a vinyl chloride resin having dissolved therein a daylight fluorescent dye or colorant, and drying the transparent surface layer at a temperature below that which darkens or discolors the transparent surface layer.

The daylight fluorescent dyes or colorants useful in preparing the "fluorescent pigments," in accordance with the teaching of U.S. Patent 2,809,954, include the rhodamines, naphthalimides and coumarins, which are incorporated in a completely condensed thermoplastic melamine-sulfonamide-formaldehyde resin. "Fluorescent pigments" useful in this invention may also be prepared by incorporating the fluorescent dyes disclosed in U.S. Patents 2,277,169 and 2,653,109 in the transparent resin in the manner described in U.S. Patent 2,809,954.

The products of this invention are particularly useful as shoe uppers for women's shoes, handbags, belts, jackets, millinery, backing for pressure sensitive tape, boat cushions, pennants, signal flags and various novelties.

A diagrammatic representation of the daylight fluorescent sheet material of this invention is as follows:

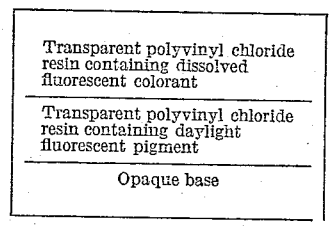

The following is a detailed description of a preferred mode of carrying out this invention:

A woven cotton sateen fabric running 1.32 yards per 53" width is bleached to produce a white fabric. The bleached fabric is calender coated on one side with the following composition:

*Calender coating*

|  | Parts by wt. |
|---|---|
| Polyvinyl chloride "Geon" 101 | 41.00 |
| Calcium carbonate filler | 24.60 |
| Dioctyl phthalate plasticizer | 27.60 |
| Epoxidized soya oil ("Paraplex" G-62) | 1.20 |
| Cadmium/barium salt complex heat stabilizer | 1.30 |
| Stearic acid | .30 |
| Epoxidized tall oil | 1.60 |
| Titanium dioxide pigment | 2.40 |
|  | 100.00 |

The last two ingredients are thoroughly ground together prior to incorporating with the remaining ingredients and the entire formula is then thoroughly mixed in a Banbury mixer and then calendered onto the white fabric base in the form of a film weighing about 10–12 ounces per yard per 50" width.

The calender coated fabric is embossed in a slight pebble grain to provide a textured surface to permit the uniform deposition of subsequently applied vinyl chloride plastisol coatings. A lemon-yellow colored polyvinyl chloride plastisol coating which is strongly fluorescent in daylight is applied to the textured surface by means of a 100% coverage intaglio print roller. The formula for the plastisol coating is as follows:

Plastisol coating

| | Parts by wt. |
|---|---|
| Polyvinyl chloride powder, "Geon 121" | 39.0 |
| Dioctyl azelate | 8.1 |
| Epoxidized soya oil ("Paraplex" G-62) | 14.0 |
| Dioctyl phthalate | 12.6 |
| Barium/cadmium complex salt | 1.3 |
| Daylight fluorescent pigment prepared as described in Example 9 of U. S. Pat., 2,809,954 | 22.7 |
| Odorless kerosene diluent ("Bayol" D) | 2.3 |
| | 100.0 |

A mixture of "fluorescent pigments," such as those described in Examples 7–12 of U.S. Patent 2,809,954 can be used in the above examples to achieve special color effects.

The plastisol coating is prepared in the well known manner by thoroughly mixing the above ingredients at room temperature.

Sufficient of the above plastisol coating is applied by means of a fixed clearance doctor knife to the fused and textured polyvinyl chloride white base coating to deposit about 5.0 to 15.0 ounces of the dry coating per yard per 50" width. The plastisol coated material is next subjected to a heat zone to evaporate the kerosene and raise the temperature of the plastisol coating to 300–350° F. at which temperature the polyvinyl chloride particles fuse or dissolve in the plasticizers. The completely condensed melamine-sulfonamide-aldehyde resin of the "fluorescent pigment" particles does not dissolve or fuse in the plasticizers at this temperature. However, the "fluorescent pigments" darken and due to the uneven temperature in the heat zone, the darkening is not uniform, thus resulting in an unevenly colored coating.

To overcome the darkening and unevenness of the color in the fused plastisol coating, a coat of a solution of polyvinyl chloride, polymethyl methacrylate and the same fluorescent dyes used in the plastisol coating is applied as a final surface layer. The formula is the solution surface coat is as follows:

Final solution coat

| | Parts by wt. |
|---|---|
| Vinyl chloride resin (copolymer of about 90 parts vinyl chloride and 10 parts vinyl acetate) ("Vinylite VYNS") | 9.3 |
| Polymethyl methacrylate ("Lucite" 41) | 3.1 |
| Silica gel ("Santocel") | .3 |
| Methyl ethyl ketone | 80.3 |
| Brilliant yellow 6G (4-amino-1,8-napthal-2',4'-dimethyl phenylimide) | 5.0 |
| Ultraviolet absorber | 2.0 |
| | 100.0 |

The above composition is prepared by first dissolving the vinyl chloride resin and polymethyl methacrylate in hot (about 78° C.) methyl ethyl ketone. The resin solution is allowed to cool to room temperature after which the silica gel, dispersed in methyl ethyl ketone, ultraviolet absorber and the fluorescent dye are added and the composition thoroughly mixed until the dye is dissolved and the silica gel is uniformly dispersed.

Specific examples of ultraviolet absorbing agents which can be used in final solution coats include:

2,3-diphenyl quinoxaline
2,3-diphenyl-6-methyl quinoxaline
Ethylene glycol disalicylate
5,7-dibromo-8-hydroxyquinoline The final solution coat is applied by means of a doctor knife, however, other means, such as doctor roller, or 100% coverage intaglio print roller can be used. Sufficient of the solution surface coat is applied to deposit a dry coating weighting about .5 to 2.0 ounces of dry coating per yard per 50" width. The methyl ethyl ketone was evaporated from the final surface coat by passing the material through a heat zone (about 200–250° F.).

The coated fabric is next embossed by passing the material between pressure rollers or plates, one of which has a design engraved on its surface. The engraved surface being in contact with the fluorescent surface coat.

The final product was a uniformily brilliant lemon-yellow fluorescent coated fabric, particularly useful as shoe upper for women's shoes, women's handbags, belts and jackets.

The embossing operation is not essential and may be omitted.

The criticality of having the fluorescent colorant present in the intermediate layer in particulate form is demonstrated by omitting the intermediate layer and replacing it with an equal amount of the solution coat having the fluorescent dye present in the dissolved state. Such a product is considerably less brilliant and the fluorescent is greatly reduced. The light fastness is also considerably reduced. It was surprising and unexpected that a synergistic effect with respect to brilliance, fluorescense and durability could be obtained by applying a solution of a fluorescent dye over a darkened and unevenly discolored base layer containing particulate "fluorescent pigments."

Unusual novel effects can be produced by printing the white base layer with a black printing ink in any desired design which leaves a portion of the white base uncoated, then applying the plastisol coating containing the "fluorescent pigments" over the printed base, followed by fusing and application of the final solution coat to the darkened fused plastisol coat. The area of the white base not covered by the black printing ink has the maximum fluorescence and that portion which is covered with the black printing ink has very little or no fluorescence depending upon the intensity of the black or amount of black ink applied over the white base. A typical formula for a black printing ink to use between the white base the plastisol coating is as follows:

| | Parts by wt. |
|---|---|
| Copolymer of about 90 parts vinyl chloride and and about 10 parts vinyl acetate, "Vinylite VYNS" | 12.5 |
| Methyl ethyl ketone | 56.0 |
| Methyl isobutyl ketone | 16.8 |
| Silica gel ("Santocel") | .5 |
| Carbon black | 1.0 |
| Calcium carbonate | 2.8 |
| Dioctyl phthalate | 9.7 |
| Soya lecithin oil | .7 |
| | 100.0 |

It is within the scope of this invention to omit the white calender coating and apply the polyvinyl chloride plastisol coating containing the "fluorescent pigment" particles directly onto a white bleached fabric.

It is also possible to replace the base fabric with a temporary carrier which is stripped from the layered structures before converting it to end uses, such as shoes, belt, etc.

Another variation is accomplished by preparing especially smooth surfaced products by molding the surface layer of the above described coated fabric against a sheet of cellophane in accordance with the method described in U.S. Patent 2,801,949.

The woven fabric base layer of the specific example described above may be replaced with non-woven and knitted fabrics made from either natural or synthetic fibers. Exemplary synthetic fibers useful in forming the base layer are nylon, acrylonitrile polymer, polyesters, such as polyethylene terephthalate, viscose, rayon, vinylidene chloride, mixtures thereof, etc.

The vinyl chloride resins useful in the white opaque substratum and the fluorescent transparent intermediate layer include the homopolymer of vinyl chloride and copolymers of vinyl chloride and minor amounts (10–2% by weight of copolymer) of another ethylenically unsaturated monomer copolymerizable therewith, such as vinyl acetate, vinylidene chloride, ethyl or methyl maleate, and ethyl or methyl fumarate. These resins are considered to be insoluble, i.e., 10–20% solution of the resins in methyl ethyl ketone will set to a gel at room temperature.

The vinyl chloride resins useful in the final surface coat are the more soluble resins, i.e., a 10–20% solution of the resin in methyl ethyl ketone do not gel at room temperature. It is important that the surface coating composition not gel in order that it can be uniformly applied by print rollers. The copolymers of vinyl chloride which contain 50–10% (based on the weight of the copolymer) of another ethylenically unsaturated monomer, such as those mentioned above, are useful in the surface layer. Such soluble resins are generally soft and tacky in film form. To overcome the softness of the copolymer resins in the surface coat, silica gel and polymethyl methacrylate are incorporated in the final surface coat.

I claim:
1. A daylight fluorescent thermoplastic resin sheet material comprising:
   (a) an opaque white substratum,
   (b) in adherent contact therewith a transparent intermediate stratum comprising a plasticized vinyl chloride resin having distributed throughout particles of daylight fluorescent pigment, and
   (c) in adherent contact with said intermediate stratum a transparent surface stratum comprising a vinyl chloride resin having daylight fluorescent colorants dissolved therein.

2. A daylight fluorescent coated fabric comprising:
   (a) a fabric base layer,
   (b) in adherent contact with said base layer an opaque substratum of a white coating comprising vinyl chloride resin as the essential film forming component,
   (c) in adherent contact with said substratum a transparent intermediate stratum comprising a plasticized vinyl chloride resin having particulate daylight fluorescent pigments dispersed throughout, and
   (d) in adherent contact with said intermediate stratum a transparent surface stratum comprising a vinyl chloride resin having daylight fluorescent colorants dissolved in said vinyl chloride resin.

3. A daylight fluorescent coated fabric comprising:
   (a) a fabric base layer,
   (b) in adherent contact with said base layer an opaque substratum comprising polyvinyl chloride, plasticizer and white pigment,
   (c) an adherent intermediate transparent stratum comprising polyvinyl chloride, plasticizer and particulate daylight fluorescent pigment distributed throughout, and
   (d) an adherent transparent surface stratum comprising polyvinyl chloride, polymethyl methacrylate, silica, and daylight fluorescent colorants dissolved in said polyvinyl chloride.

References Cited in the file of this patent

UNITED STATES PATENTS 2,809,957    Kazenas _____ Nov. 15, 1957

FOREIGN PATENTS 608,725    Great Britain _____ Sept. 20, 1948